Figure 1:
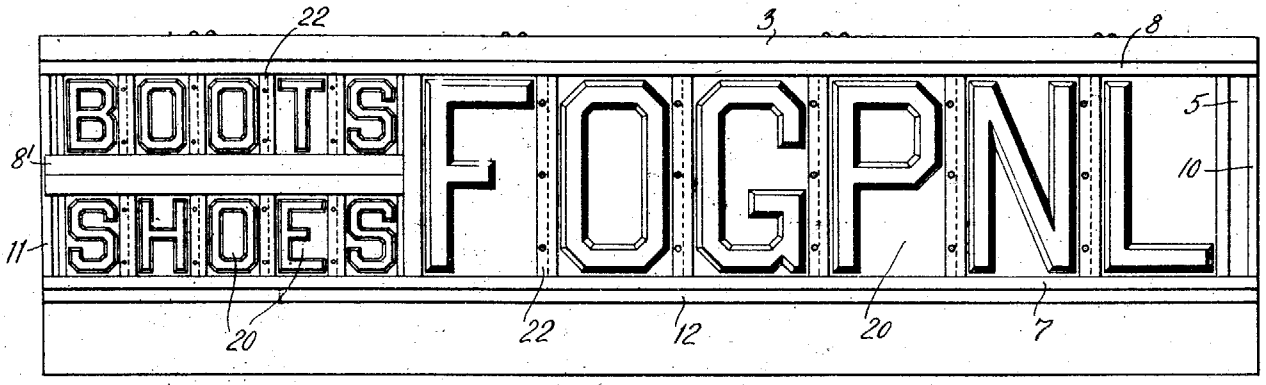

R. R. WILEY.

ILLUMINATED SIGN.

APPLICATION FILED FEB. 6, 1917.

Reissued July 1, 1919.

14,679.

2 SHEETS—SHEET 1.

Inventor.

Roy R. Wiley by Wm. Macomber

Attorney.

R. R. WILEY.

ILLUMINATED SIGN.

APPLICATION FILED FEB. 6, 1917.

Reissued July 1, 1919.

14,679.

2 SHEETS—SHEET 2.

Inventor.

Roy R. Wiley

By Thos Macomber

Attorney.

UNITED STATES PATENT OFFICE.

ROY RODNEY WILEY, OF BUFFALO, NEW YORK, ASSIGNOR, BY MESNE ASSIGNMENTS, TO FLEXLUME SIGN COMPANY, OF BUFFALO, NEW YORK, A CORPORATION OF NEW YORK.

ILLUMINATED SIGN.

14,679. Specification of Reissued Letters Patent. Reissued July 1, 1919.

Original No. 828,005, dated August 7, 1906, Serial No. 230,464, filed October 28, 1904. Application for reissue filed February 6, 1917. Serial No. 147,018.

*To all whom it may concern:*

Be it known that I, ROY RODNEY WILEY, a citizen of the United States, residing at Buffalo, in the county of Erie and State of New York, formerly of St. Catharines, in the Province of Ontario and Dominion of Canada, have invented a certain new and useful Improvement in Illuminated Signs, of which the following is a full, clear, concise, and exact description, reference being had to the accompanying drawings, forming a part of this specification.

My invention relates to illuminated signs, and particularly to electrically-illuminated signs, and shows an adaptation of my invention or discovery more fully set forth in a divisional reissue application of even date herewith, Serial No. 147,019.

The object of my invention is to provide in one design a sign which combines the features of flexibility, moderate cost, legibility, and durability, together with great simplicity of construction and operation.

The sign in the simplest form consists of a body containing the lamps and having the front open, before which opening interchangeable letter-plates may be inserted, the body of the letter-plates being comparatively opaque, while the letters are transparent and are raised or pressed from the letter-plates, which are formed in relief from plates or planes or sheets of glass. With this construction a sign of any size can be quickly and cheaply assembled.

In assembling the sign the only operations necessary would be the insertion or extraction of flat plates with raised glass characters, and to allow any one character to be put in place or removed without disturbing the others I adapt these plates to be inserted in the sign from the front.

As a sign of this construction need not accommodate itself to the size of standard lamps, these signs may be readily constructed on a reduced scale and adaptable for such places as show-windows or other limited areas. Also by employing the raised glass characters the sign will be extremely legible by day or night. In the day-time the raised glass letters will stand out with great clearness and contrast from their darker-colored background, and at night the transparent characters appear to consist of solid masses of light, all of the light being utilized in illuminating the letters. The raised characters also render the sign equally legible from the front and the sides.

Instead of employing an abundance of conductors I need but two conductors or bus-bars, which pass through the interior of the sign and which may be completely insulated, and thus render the sign absolutely fireproof. On account of the lamps being entirely inclosed within the body the sign may also be rendered absolutely waterproof. Only one illuminant, such as a Cooper-Hewitt tube, may serve for the entire sign, or one or more incandescent lamps may serve as illumination for the letters. Each character also may be provided with one or more lamps, the incandescent lamps being preferably attached directly to the bus-bars to eliminate the necessity of additional wiring. Deflectors may also be employed at the interior of the sign to direct the light to the letters and to intensify the illumination thereof.

In signs of very large construction I preferably provide a separate lamp and reflector for each character, while in smaller signs, as before stated, several characters may be illuminated from one source, and the characters may be subdivided into smaller sizes, and thus any size or length of legend produced.

Other novel features of construction and arrangement are also incorporated in my invention, which will be better understood by referring to the accompanying drawings, which will illustrate one form of sign of my improved construction.

Figure 2:
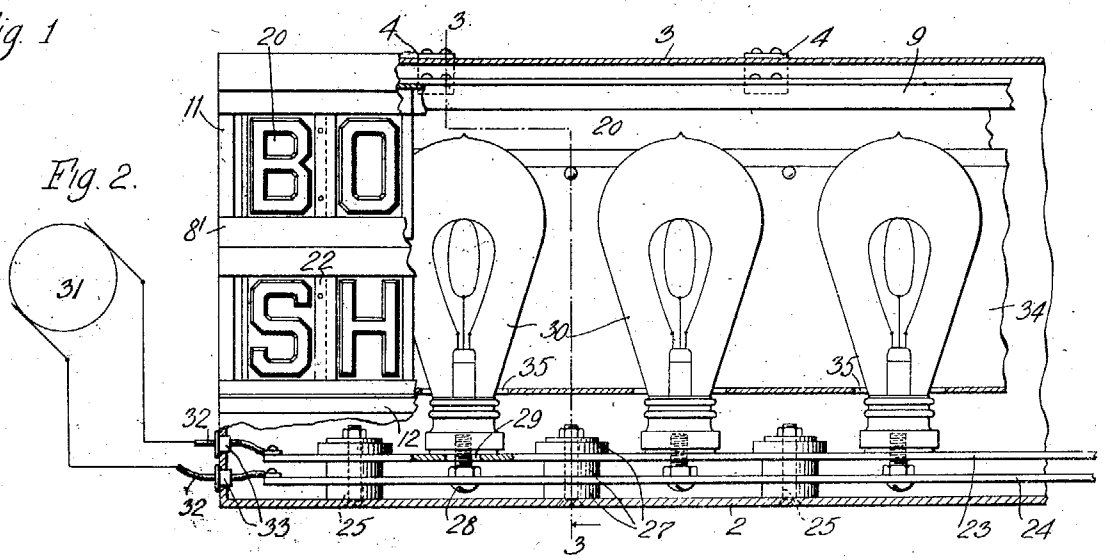
Figure 3:
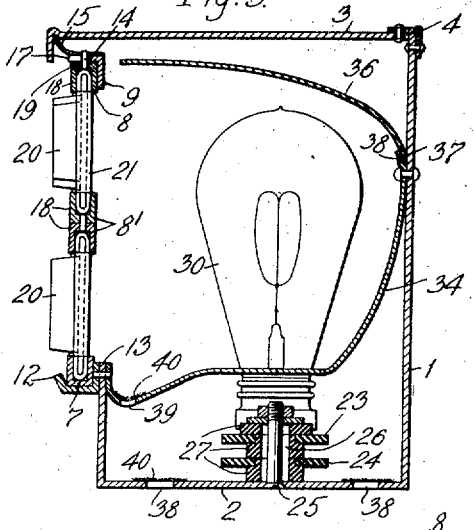
Figure 4:
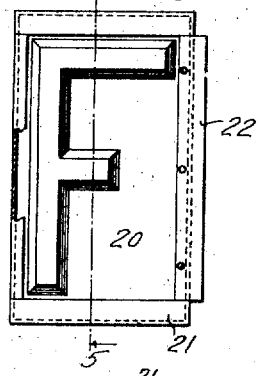
Figure 5:
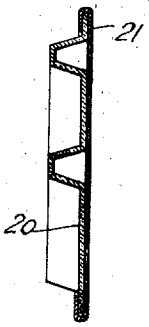
Figure 6:
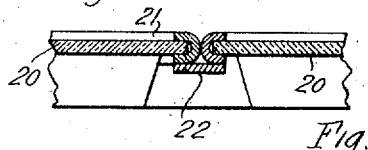
Figure 7:
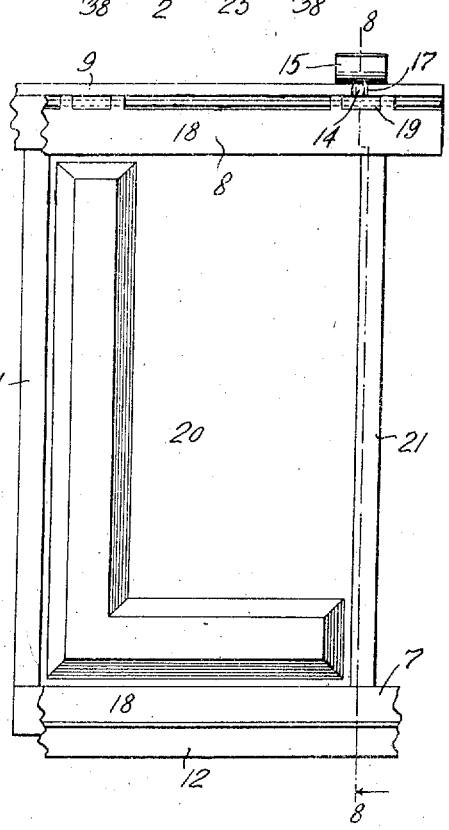
Figure 8:
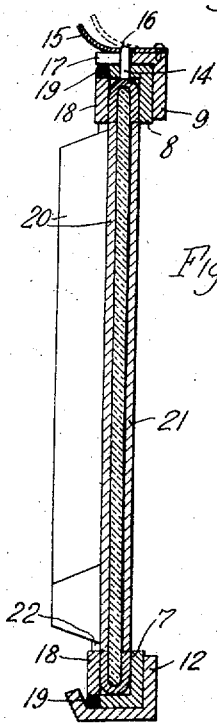

Figure 1 is a front view of a sign, showing the letters assembled therein to form legends. Fig. 2 is an enlarged front view of a sign, part of the front thereof being removed to more clearly show the interior arrangement of parts. Fig. 3 is a sectional view on line 3 3 of Fig. 2. Fig. 4 shows the front view of a character-plate with a raised letter thereon. Fig. 5 is a cross-sectional view taken on line 5 5 of Fig. 4. Fig. 6 is a top view showing a light-tight connection between character-plates. Fig. 7 is an enlarged view of the letter-frame with a letter inserted therein, and Fig. 8 is a sectional view taken on line 8—8 of Fig. 7.

Like reference characters refer to like parts throughout the various figures.

The body of the frame has a rear wall 1 and a base-wall 2, the top 3 of the frame being hinged at 4, as shown. The front of the box is cut away to leave an opening 5, in which are inserted the letter-frames 7 and 8. An angle-iron 9 extends between the end walls 10 and 11 of the frame, and a shallow trough 12 is secured at the lower edge 13 of the opening 5, the letter-frame being adapted for insertion between the angle-iron and said trough. At the ends of the top of the letter-frames pins 14 extend upwardly for engaging retaining spring-clasps 15 and for finally entering opening 16 in the spring-clasps. The rear end of the spring-clasp is secured to the top of the angle-iron 9, while the free end thereof is bent upwardly more readily to receive the pins on the letter-frames, and the angle-iron 9 has slots 17, through which the pins may pass. The lower part of the letter-frame is disposed in the trough 12, and to insert a frame within the opening 5 the lower edge thereof is placed in the trough 12 and the upper part thereof swung into the angle-iron 9, whereupon the spring-clasps engage the pins 14 and securely hold the letter-frames in position. The upper and lower parts of the letter-frames are provided with front walls 18, provided with friction-hinges 19, which hinged walls readily allow insertion of the letter-plates 20 20 from the front of the frame.

The letter-frame may extend entirely across the opening 5, or it may be subdivided into smaller letter-frames 8′ 8′, as shown at the left of Figs. 1 and 2 and in section in Fig. 3. These smaller letter-frames are also provided with hinged front walls and may be readily secured together by means of pins and adapted for insertion within the angle-iron and trough in the same manner as the larger frame 8. The letter-plates are interchangeable and each readily inserted from the front of the sign-frame without disturbing other letter-plates. In arranging the legends of the sign the various letter-frames are removed therefrom, and upon opening the hinged front walls thereof the letters may be very readily placed therein and arranged to form suitable legends. The hinged walls being now closed to hold the letter-plates in position, the letter-frames may be bodily placed in the trough 12 and within the angle-iron 9 and will be held therein by the spring-clasps 15. The letter-plates themselves may be directly inserted between the angle-iron and trough without the use of letter-frames.

I form the letters or characters from plates or planes of glass which have been made by the usual and well-known processes of glass-making, by heating such plates until the same are ductile, but not hot enough to destroy the glaze or luster characteristic of sheet glass, and then, by application of pressure with the heated plate lying upon a proper form, bringing the same to the high relief shown in Figs. 4 and 5. The letters are preferably pressed to form sharp corners, whereby a prismatic effect is obtained and the letters themselves are transparent, while the body of the plate is rendered opaque. The plate may also be of one color and the letter of a different color.

When the glass plates are thin, they may be strengthened and protected by surrounding them with a tin reinforcing rim 21, but when made of thick glass this is unnecessary, the plates being then of sufficient strength. To prevent escape of light between adjacent letter-plates, a rib 22 is provided for each letter-plate, which may be secured to the rim, as shown, the rib being placed to overlap the edge of the adjacent letter-plate, and these ribs also serve to more securely hold the letter-plates together and in place within the letter-frame.

Any illuminant may be placed within the sign-frame behind the letter-plates and the entire light will be utilized, as the rays thereof can pass only through the transparent letters, which will stand out boldly and appear as blocks of light. A single lamp, such as a Cooper-Hewitt lamp, may extend throughout the entire length of the sign, or a plurality of incandescent lamps may be used, as shown.

To feed the lamps and also to support them, I provide bus-bars 23 and 24, which are secured to the base 2 of the frame by means of bolts 25. These bolts pass through openings 26 of porcelain washers 27, disposed between the bus-bars, as shown, and thus the bus-bars are thoroughly insulated from the bolts and from each other. Contact-screws 28 are secured to the lower bus-bar 24 and extend upwardly through enlarged openings 29 and beyond the upper bus-bar 23, being adapted for engagement with one terminal of incandescent lamps 30 30, and the other terminal of the lamps is connected with the upper bus-bar 23 upon screwing the lamp down. A source of current 31 is connected with the bus-bars by means of terminal conductors 32 32, which may pass through insulating-bushings 33 in the wall of the sign-frame. Instead of using bus-bars, as shown, lamp-sockets might be used and suitably connected together by conductors.

To intensify the light and to direct the rays thereof through the transparent raised letters, I provide reflector means, which may be in the shape of a continuous reflector 34, extending throughout the sign-frame, or a plurality of reflectors may be used—one for each lamp, for instance. The reflector practically incloses the opening 5, and the lamps extend through opening 35 in the base of the reflector upwardly, so that the light centers of the lamps are disposed in the focus of the reflectors, and thus all the rays of the light are confined and deflected outwardly through the transparent letters.

To allow ready insertion of the lamps and to render them more accessible to repairs, I provide a removable top 36 for the reflector, the rear edge 37 thereof being engaged by the upper edge 38 of the lower part of the reflector, as shown, and upon the opening of the swinging cover of the sign-frame the reflector-top may be readily removed and the interior of the sign-frame opened for inspection or repairs.

To prevent undue heating of the sign, ventilating-openings 38 38 are provided in the base of the frame and openings 39 are provided in the reflector, and to prevent entrance of insects I dispose screens 40 over the openings.

I thus provide an extremely flexible illuminated sign of a very simple and durable construction in which a maximum efficiency or legibility is obtained with minimum current consumption.

Owing to the easy manner in which the individual letter-plates may be interchanged and inserted from the front, a sign with any legend may be quickly assembled, and as the letters may be made of any size the sign may be very small and adaptable for limited spaces, such as show-windows, show-cases, or the like. The letters also being pressed from glass and prismatic are extremely legible both by day and night and from all directions. The arrangement of the lamps and reflectors also insures all of the light being thrown through the raised glass characters, and thus there is absolutely no waste.

The sign, owing to the construction described, is entirely waterproof, and as the construction material used may all be fireproof the sign is protected against fire injury from both within and without.

I claim as new and desire to secure by Letters Patent—

1. In an illuminated sign, the combination with a box-like supporting-frame having a front opening and parallel channels extending along the edges of the front opening, of lamps disposed within the frame to the rear of said opening, a letter-frame disposed between said channels, spring means for locking said letter-frame within said channels, and interchangeable letter-plates held in said letter-frame, the edges on said plates having overlapping edges for preventing escape of light between adjacent plates.

2. In an illuminated sign, the combination with a frame, of letter plates in said frame, the letters being pressed in relief from pre-existing flat sheets of glass, thereby retaining the glaze and finish of said sheets.

3. In an illuminating sign the combination with a box-like frame, of glass letter plates removably supported in said frame, and comprising prepared flat sheets with raised letters formed by being pressed therein, the body of the plate being rendered opaque and the letters translucent.

ROY RODNEY WILEY.